Sept. 15, 1959     B. C. CRANE ET AL     2,904,652
UNIDIRECTIONALLY ACTUATED SWITCHING APPARATUS
Filed March 19, 1957
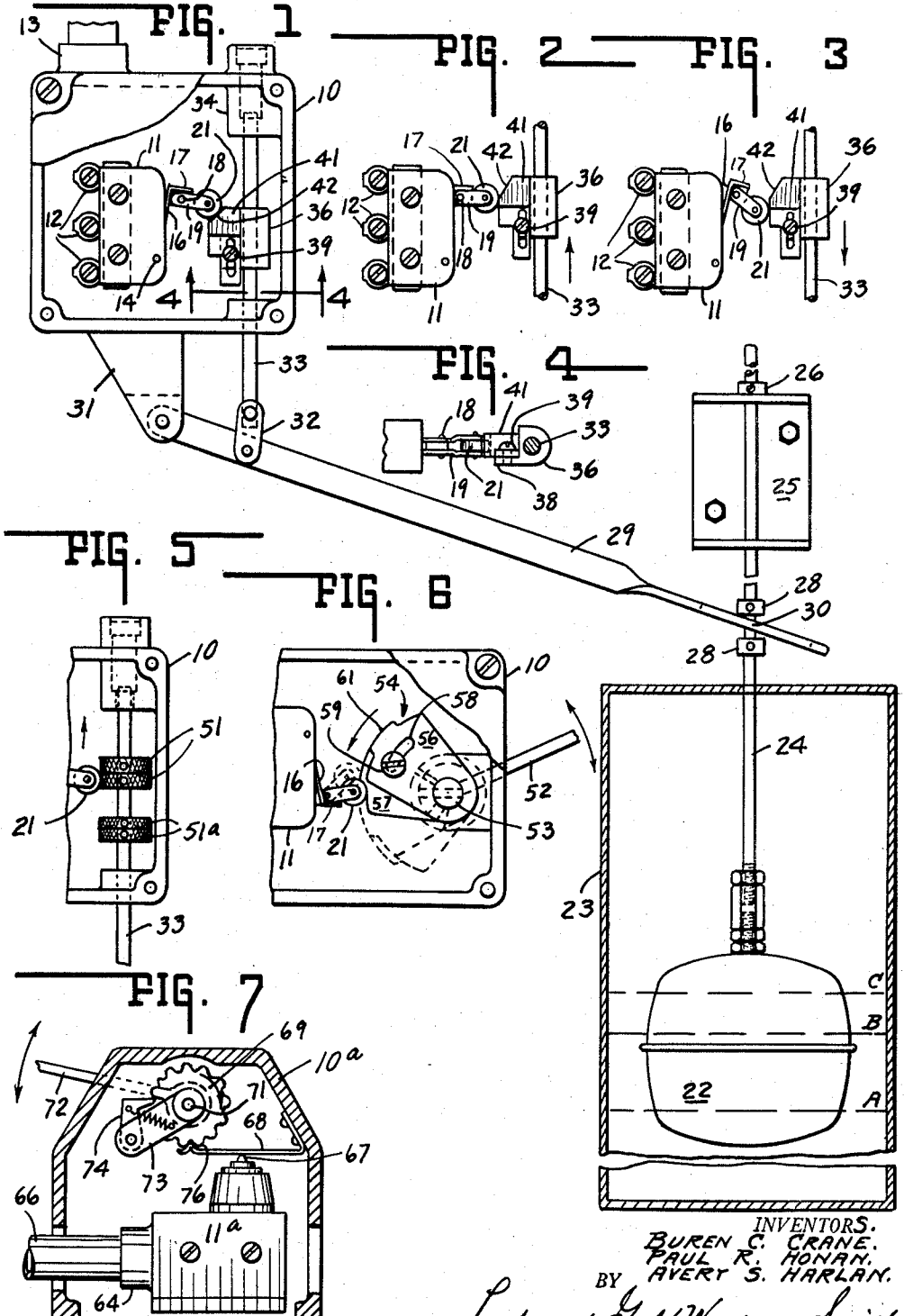
INVENTORS.
BUREN C. CRANE.
PAUL R. HONAN.
AVERY S. HARLAN.
BY
Lockwood, Galt, Woodard & Smith
ATTORNEYS.

United States Patent Office 2,904,652
Patented Sept. 15, 1959

2,904,652

UNIDIRECTIONALLY ACTUATED SWITCHING APPARATUS

Buren C. Crane and Paul R. Honan, Lebanon, and Avery S. Harlan, Indianapolis, Ind., assignors, by mesne assignments, to Indiana Commercial Filters Corporation, Lebanon, Ind., a corporation of Indiana Application March 19, 1957, Serial No. 646,999

7 Claims. (Cl. 200—84)

The present invention relates to switch assemblies which are actuated by a movable member and particularly to switch assemblies in which the switch or control is actuated in one sense as the movable member moves in one direction to a predetermined position, is actuated in another sense after the movable member has moved in the said one direction to a further predetermined position, but is not actuated as the movable member returns in opposite direction through both of the predetermined positions.

This application is a continuation-in-part of the co-pending application of Avery S. Harlan et al., Serial No. 582,188, filed May 2, 1956, for Liquid Filter Device. This co-pending application is directed to a filtering device and system in which one aspect of operation requires float operation of a switch assembly as the liquid level in a receptacle rises to a first predetermined level and deactuation of the switch after a predetermined further rise in liquid level, the switch remaining deactuated as the liquid level falls below the original switch actuating level.

The present invention encompasses several embodiments of a switch assembly fulfilling the requirements set out above and having particular use as a float switch in the filtering device which is the subject of the aforementioned co-pending application.

A further feature of the present invention is the provision for adjustment of both the movement required between the actuation and deactuation of the switch and the adjustment of the motion necessary from a given reference point to actuate the switch.

The full nature of the invention will be understood from the accompanying drawings and the following description and claims:

Fig. 1 is a side view partially in section of an assembly embodying the present invention and including the float actuator;

Fig. 2 is a side view of a portion of the apparatus shown in Fig. 1 but in different relative positions;

Fig. 3 is a view similar to Fig. 2 with the parts shown in different relative positions;

Fig. 4 is a view taken generally along the line 4—4 of Fig. 1.

Fig. 5 is a fragmentary view of a modified form of the apparatus shown in Fig. 1;

Fig. 6 is a fragmentary view of a further modified form of the apparatus shown in Fig. 1; and Fig. 7 is a side sectional view of a further modified form of the invention.

Referring initially to Fig. 1 there is shown at 10 a generally rectangular housing having fixedly mounted therein a totally enclosed, normally opened switch 11 having suitable terminal screws 12 which may be conventionally connected to control wiring which has entry into the housing 10 through the conduit 13. The switch 11 is of the type which has pivotally mounted therein at 14 a movable actuating member 16 which, intermediate its length, is adapted to bear against a switch actuating thrust pin (not shown). The member 16 has its free end 17 formed at right angles to its major axis and this end 17 carries a flange mounting a pivotal pin 18. Pin 18 carries thereon a pivotally movable pawl or roller carriage member or yoke 19 having its upper edges arranged for engagement with the lower side of end 17 and which in turn mounts for rotation thereon a roller 21.

It will be apparent by comparing Figs. 1 and 2 that any force applied to roller 21 in an upward direction because of the engagement of yoke 19 with the lower side of actuating member end 17, will cause counterclockwise pivotal movement of member 16 to actuate the switch 11. It will be further evident from Fig. 3 that any force applied to the roller 21 in a downward direction will pivot the member 19 downwardly about the pin 18 and will not move the member 16 counterclockwise to actuate switch 11 as was the case when an upward force was applied to the roller 21.

The means for actuating the switch 11 comprises a float 22 adapted to ride upon the surface of the liquid contained in a receptacle or tank 23. The float 22 has extending from the top thereof a rod appropriately journaled in a bracket 25 and is provided with a stop member 26 which establishes the lower limit of motion of the float 22. The rod 24 further carries collars 28 which cooperate with a connecting member rod 29 forked at 30 and through which the rod 24 freely extends. It will be understood that the stop 26 and collars 28 may be adjustably displaced in position along the rod 24 to calibrate the float assembly. As shown in Fig. 1 the member 29 is pivotally mounted on a hanger 31 depending from the housing and is connected by means of a link 32 to the lower end of a reciprocable rod 33 which extends freely through an appropriate opening in the housing 10 and is journaled at its upper end in an appropriate boss 34 within the housing 10. Intermediate its ends and within the housing 10 the rod 33 carries a bracket 36 having an offset flange 38 (Fig. 4) to which is attached by means of screw 39 a cam block 41 having a cam surface 42 adated to cooperate with roller 21. Cam 41 has a reduced, depending slotted portion which accommodates the screw 39 and permits adjustment of the cam block 41 relative to the bracket 36.

In the operation of the assembly shown in Fig. 1, while the liquid level in the tank 23 and consequently float 22 are in a position approximating level A, the cam 41 and the switch actuating member 16 are free of one another and the normally open switch 11 is consequently deactuated. Should the liquid level in the tank 23 increase to level B, the rod 33, cam block 41 and the actuating member 16 will be moved to the position of Fig. 1 in which member 16 will be pivotally moved counterclockwise to actuate the switch 11 to closed position, thereby operating mechanism (not shown) which causes further rise of the liquid. Upon further rise of the liquid in the tank 23 to level C the float will move rod 33 upwardly beyond its position of Fig. 1 to the position of Fig. 2 maintaining actuation of the switch, and when level C is reached, the roller 21 will ride off the surface 42 of the cam 41 permitting member 16 to assume its position of Fig. 3, deactuating the switch 11 and causing lowering of liquid level. As the liquid level in the tank 23 subsequently decreases through levels C and B the rod 33 and cam 41 will correspondingly be moved from their position of Fig. 3. As will be evident from Fig. 3, during this downward motion of the cam 41 the roller 21 will be displaced relative to the actuating member 16 permitting the member 16 to remain in its switch deactuated position and yoke 19 and roller 21 will eventually assume the Fig. 1 position without actuating switch member 16. From the foregoing it will be understood that the assembly just described provides a switch actuating sequence particularly suitable for filter device operation in which a control switch is actuated when the liquid level is increased to a predetermined point above the normal liquid level and is deactuated when the liquid level further increases to a second predetermined point above the normal liquid level, and during subsequent decrease in the liquid level back to its normal value the switch is retained in its deactuated position.

Referring now to Fig. 5 there is disclosed a modified form of the switch actuating apparatus in which the rod 33 carries adjustably mounted thereon one or more disk-shaped cam members 51 having knurled outer margins adapted to cooperate with the roller 21. It will be evident that the number of the members 51 which are contiguously mounted on the rod 33 for cooperation with the roller 21 will establish the motion required to move switch 11 from its actuated to its deactuated position on the upward stroke of rod 33 thereby providing a means for varying the liquid level differential between the levels B and C. Additional members 51a are shown in Fig. 5 in stowed position, these having no function in the switch operation until they are displaced upwardly and contiguously to the members 51 as desired.

Fig. 6 discloses a further modified form of the switch actuating assembly in which a member 52, corresponding to the member 29 of Fig. 1, is given pivotal movement by a float (not shown). The pivotal movement of the member 52 takes place about a shaft 53 journaled in the housing 10 to which the inner end of the member 52 is rigidly fastened. The shaft 53 carries adjustably thereon a dual-sector cam 54 comprising cam sectors 56 and 57 which may be adjustably displaced relative to each other by means of slot 58 in the sector 56 accommodating a screw 59 threaded into the sector 57. This relative adjustable displacement of the sectors 56 and 57 provides a means for varying the extent of a land surface 61 provided by the sectors 56 and 57. The position of the parts in Fig. 6 indicates that the liquid level has increased to a point just below the level B. Any further increase in liquid level will move the cam 54 to its switch actuating position and then toward its broken line position in Fig. 6 and will consequently move member 16 to actuate the switch. As the liquid level increases to level C the cam 54 will assume its broken line position of Fig. 6 and the roller 21 will ride along the land 61 permitting deactuation of the switch. As the liquid level subsequently falls, the roller 21 will again ride upon the land 61 and roller 21 will then have been moved to its broken line position of Fig. 6 and will not move the member 16 to again actuate the switch. It will be understood that the absolute values of the various liquid levels may be varied by displacing the cam sectors with relation to the shaft 53 and that by varying the displacement of the cam sectors relative to each other the liquid level differential between the levels B and C may be varied.

Referring now to Fig. 7 there is disclosed a further modified form of the invention in which a housing 102 encloses a normally open switch 11a provided with a conduit fitting 64 receiving an electrical conduit 66 which extends into the housing 10a. The switch 11a differs from the switch 11, previously referred to, in that it is actuated by depression of an actuating member in the form of a thrust pin 67. Mounted adjacent the pin 67 and bearing against it is a movable abutment in the form of an elongated resilient member 68. The free end of the member 68 is adapted to cooperate with the toothed outer periphery of a camming member 69 which is freely journaled on the shaft 71 for rotation in the housing 10a. It will be noted that the member 69 while journaled on shaft 71 is free to rotate independently of the shaft 71 and does not rotate with the shaft. A float operated member 72, corresponding to the member 52 of Fig. 6 is rigidly secured to the shaft 71 so that movement of the member 72 in the indicated directions results in rotation of the shaft 71. The shaft 71 rigidly carries a crank arm 73 at the free end of which is pivotally mounted a spring biased pawl 74 adapted to cooperate with the teeth carried by the member 69. With the parts in their position of Fig. 7, the member 68 has its free end positioned in the groove between the adjacent teeth in the member 69 and switch 11a is therefore deactuated. As the liquid level increases to level B the member 72 will be moved upwardly, rotating shaft 71 clockwise, and causing pawl 74 to correspondingly advance member 69 so that the tooth 76 rides on the free end of member 68 thereby depressing the pin 67 to actuate the switch 11a. Further increase in the liquid level of level C will cause the member 72 to further rotate clockwise shaft 71 and through the pawl 74 will further advance the member 69 clockwise until the free end of the member 68 again drops into the next groove between the teeth on the member 69, releasing pin 67 from its depressed position and thereby deactuating the switch 11a. Upon the subsequent decrease in liquid level the member 72 will be moved downwardly, rotating the shaft 71 is counterclockwise direction. During this counterclockwise movement of the shaft 71, the pawl 74 will slip over the teeth on the member 69, the member 69 being held against counterclockwise rotation by the pawl through the locking action of the member 68. It will thus be evident that the downward motion of the member 72 which occurs as the liquid level is decreasing, is not converted into rotation of the member 69 and the switch 11a is consequently permitted to remain in deactuated position as the liquid level falls below levels C and B.

While the invention has been disclosed and described in some detail in the drawings and foregoing description, they are to be considered as illustrative and not restrictive in character, as other modifications may readily suggest themselves to persons skilled in this art and within the broad scope of the invention, reference being had to the appended claims.

The invention claimed is:

1. A float switch assembly of the type in which a switch is actuated upon an increase in liquid level to a first predetermined point and is deactuated upon a further increase in liquid level to a second predetermined point comprising a housing and an enclosed switch fixedly mounted therein, an actuating arm pivotally mounted on said switch and adapted to actuate the switch upon displacement thereof, a movable abutment carried by said arm, a float operated rod reciprocable within the housing, and a plurality of contiguous cam discs adjustably mounted on said rod adapted to have marginal engagement with said abutment upon movement of said rod to provide switch actuating displacement of the actuating arm when the liquid level increases to said first point, switch deactuating release of said actuating arm when the liquid level increases to said second point, and retention of said actuating arm in released condition as the liquid level decreases below said both points.

2. An assembly as claimed in claim 1 in which the rod is adapted to accommodate additional cam discs to widen the liquid level differential between said first and second points.

3. A float switch assembly of the type in which a switch is actuated upon an increase in liquid level to a first predetermined point and is deactuated upon a further increase in liquid level to a second predetermined point comprising a housing and an enclosed switch fixedly mounted therein, an actuating arm pivotally mounted on said switch and adapted to actuate the switch upon displacement thereof, a movable abutment carried by said arm, a float operated element extending exteriorly of said housing, and a dual-sector cam movable by said element adapted to peripherally engage said abutment upon movement of said element to provide switch actuating displacement of the actuating arm when the liquid level increases to said first point, switch deactuating release of said actuating arm when the liquid level increases to said second point, and retention of said actuating arm in released condition as the liquid level decreases below both said points.

4. An assembly as claimed in claim 3 in which the sectors of said cam may be adjustably displaced relative to each other to vary the liquid level, corresponding to one of said points and the liquid level differential between both of said points.

5. A float switch assembly of the type in which a switch is actuated upon an increase in liquid level to a first predetermined point and is deactuated upon a further increase in liquid level to a second predetermined point comprising a housing and an enclosed switch fixedly mounted therein, a thrust pin adapted to actuate the switch upon displacement thereof, a resilient actuating arm mounted within said housing and extending adjacent said pin, a float operated element extending exteriorly of said housing, a toothed disc mounted for rotation within said housing and adapted to peripherally engage said arm, and means providing a uni-directional connection between said float operated element and said disc including a crank arm and a spring biased pawl carried by the crank arm adapted to cooperate with the teeth on said disc, said uni-directional connecting means thereby providing switch actuating displacement of the thrust pin when the liquid level increases to said first point, switch deactuating release of said thrust pin when the liquid level increases to said second point, and retention of said thrust pin in released condition as the liquid level decreases below both said points.

6. A float switch assembly of the type in which a switch is actuated upon an increase in liquid level to a first predetermined point and is de-actuated upon a further increase in liquid level to a second predetermined point comprising a housing and an enclosed switch fixedly mounted therein, an actuating member coupled to said switch and including a pawl member pivoted thereto for movement relative thereto in one direction, a camming means mounted within said housing for reciprocating movement into engagement with said pawl member, and a float operated element extending outwardly of said housing and connected with said camming means to move said camming means in said one direction to pivot said pawl without operating said actuating member and in the opposite direction to engage said pawl and operate said actuating member when said liquid level increases to said first predetermined point, said camming means being formed to release said pawl member when the liquid level increases to said second predetermined point.

7. A float switch assembly of the type in which a switch is actuated upon an increase in liquid level to a first predetermined point and is de-actuated upon a further increase in liquid level to a second predetermined point comprising a switch, an actuating member coupled to said switch and including a pawl member mounted thereon for movement relative thereto in one direction, and a float-operated camming means mounted for reciprocating movement into engagement with said pawl member, said camming means moving in said one direction to pivot said pawl without operating said actuating member and in the opposite direction to engage said pawl and operate said actuating member when said liquid level increases to said first predetermined point, said camming means being formed to release said pawl member when the liquid level increases to said second predetermined point.

References Cited in the file of this patent
UNITED STATES PATENTS

| 1,802,383 | Jarvis | Apr. 28, 1931 |
| 1,941,815 | Ringstrom | Jan. 2, 1934 |
| 2,299,959 | Brentz | Oct. 27, 1942 |
| 2,648,234 | Lester | Aug. 11, 1953 |
| 2,818,480 | Barker | Dec. 31, 1957 |